Figure 1:
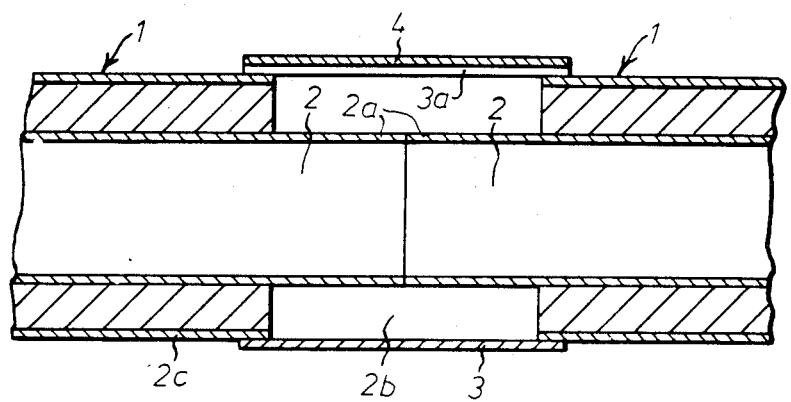

United States Patent [19]

Nordström

[11] Patent Number: 4,610,740
[45] Date of Patent: Sep. 9, 1986

[54] METHOD FOR JOINING INSULATED CONDUITS

[76] Inventor: Urban Nordström, Bülowsvägen 20, S-237 00 Bjärred, Sweden

[21] Appl. No.: 727,848

[22] Filed: Apr. 26, 1985

[30] Foreign Application Priority Data

Apr. 30, 1984 [SE] Sweden .............................. 8402345

[51] Int. Cl.[4] ............................................ B32B 31/06
[52] U.S. Cl. ..................................... 156/79; 138/155; 138/DIG. 9; 156/165; 156/229; 156/294; 156/304.2; 264/46.5; 285/235; 285/294; 285/417
[58] Field of Search .......... 138/155, DIG. 9; 156/79, 165, 229, 294, 304.2; 285/235, 292, 294, 417; 264/46.5

[56] References Cited

U.S. PATENT DOCUMENTS

| | | | |
|---|---|---|---|
| 3,677,303 | 7/1972 | Martin | 285/294 X |
| 3,847,694 | 11/1974 | Stewing | 156/165 X |
| 3,989,281 | 11/1976 | Wilde | 285/294 X |
| 4,162,093 | 7/1979 | Sigmund | 285/294 X |
| 4,226,444 | 10/1980 | Bunyan | 285/294 X |
| 4,384,905 | 5/1983 | Gros | 156/79 |
| 4,514,241 | 4/1985 | Maukola | 156/79 |

FOREIGN PATENT DOCUMENTS 8300848 2/1983 Sweden .

Primary Examiner—Robert A. Dawson
Attorney, Agent, or Firm—Merchant, Gould, Smith, Edell, Welter & Schmidt

[57] ABSTRACT

A method for joining insulated conduits is disclosed, in which the bared ends of the medium-carrying pipes are first interconnected in a per se known manner and a union piece is thereafter placed around the resulting joint, such that the union piece has an overlap on the outer side of the conduits to be joined and forms a mould for foaming an insulating material of cellular plastic in the joint. The union piece is a relatively rigid, circumferentially resilient plastic tube which is slotted throughout its entire length and, before being applied around the joint, has an inner diameter which is smaller than the outer diameter of the conduits. After the union piece has been applied around the joint, a strip is placed on the slot of the union piece throughout substantially the entire length of the slot, said strip consisting of a mouldable, curable plastic material which by curing is bondable to the union piece, and which is thereafter cured so as to be bonded to the union piece.

3 Claims, 2 Drawing Figures

METHOD FOR JOINING INSULATED CONDUITS

TECHNICAL FIELD

The present invention relates to a method for joining insulated conduits, such as prefabricated culvert piping.

PRIOR ART

A previously known method of joining insulated conduits resides in placing a jointing sleeve over the joint, filling the joint with a foamable insulating liquid through a hole provided in the sleeve, and sealing the ends of the jointing sleeve against the outer peripheral surface of the conduits by means of shrink rings. The major drawbacks of such a method reside in that it permits but a very narrow tolerance range for jointing sleeve-conduit diameter, and that the jointing sleeve must be mounted on either of the conduits before their inner medium-carrying pipes are welded together. Other conventional methods of joining conduits comprise the more complicated steps of building up or mounting a mould for the insulation of foam plastic around the joint, e.g. by means of a strip of sheet-metal or plastic which is disposed around the joint and whose ends are interconnected by screws or rivets or by welding, and where the ends of the resulting jointing sleeve are sealed against the outer circumferential surface of the conduits by means of shrink rings or by welding.

OBJECT OF THE INVENTION

The object of the invention is to provide a method of applying a mould around joints in insulated conduits, which makes it possible to overcome the above-mentioned shortcomings of the prior art methods.

DISCLOSURE OF THE INVENTION

The method according to the invention for joining insulated conduits thus is of the type in which the bared ends of the medium-carrying pipes are first interconnected in a per se known manner and a union piece is thereafter placed around the resulting joint, such that the union piece has an overlap on the outer side of the conduits to be joined and forms a mould for foaming an insulating material of cellular plastic in the joint.

To achieve the object of the invention, this method has been improved in that use is made of a union piece consisting of a relatively rigid, circumferentially resilient plastic tube which is slotted throughout its entire length and, before being applied around the joint, has an inner diameter which is smaller than the outer diameter of the conduits, and in that after the union piece has been applied around the joint, a strip is placed on the slot of the union piece throughout substantially the entire length of the slot, said strip consisting of a mouldable, curable plastic material which by curing is bondable to the union piece, and which is thereafter cured so as to be bonded to the union piece.

The resilient union piece exerts a pressure against the conduits to be joined and seal against the conduits without the use of shrink rings or any other sealing measures. In order to overcome any unevenesses on the conduits, a mastic may be placed on the inner side of the jointing sleeve on its surface portion engaging the conduits or on the end portions of the conduits engaging the sleeve. Because of the resilience of the union piece, the method of the invention is relatively insensitive to variations in the diameters of the conduits. Although the slot may become more or less wide, it can still be covered by a strip of the type described above. The mounting of the union piece around the joint is uncomplicated and can be carried out even after the medium-carrying inner pipes of the conduits have been interconnected. The ends of the slot serve as outlets for the gases produced during the foaming process and for air entrapped in the joint, i.e. no special vents need be provided in the union piece. The material of the union piece, i.e. plastic, may advantageously be transparent, such that the foaming can be visually supervised.

BRIEF DESCRIPTION OF ACCOMPANYING DRAWINGS

Figure 2:
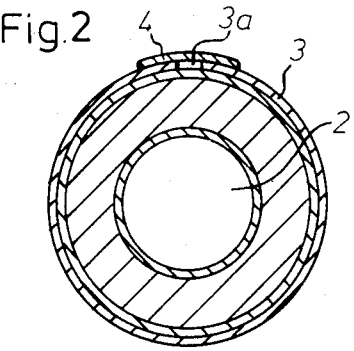

The invention will be described in more detail hereinbelow with reference to the accompanying drawings, in which FIGS. 1 and 2 illustrate a conduit joint with a mould devised in accordance with the invention, in longitudinal section and cross-section, respectively.

PREFERRED EMBODIMENT OF THE INVENTION

FIGS. 1 and 2 illustrate two insulated conduits 1 which have been joined in accordance with the invention and which comprise two medium-carrying pipes 2 whose ends 2a, from which the insulation has been stripped, have been interconnected by welding in a conventional way. Over the resulting bared joint 2b, there is placed a union piece 3 of a relatively rigid polyester material, which is tubular and has a longitudinal slot 3a. The material of the union piece has been manufactured such that the union piece is resilient in the circumferential direction. A transparent glass fibre reinforced polyester material, suited for the purposes of the invention, is manufactured e.g. by AB Bofors, Sweden, in the form of tubes having an inner diameter that is somewhat smaller than the outer diameter of the conduits 1, and are cut into lengths slightly larger than the length of the joint, whereupon the resulting tubular pieces are cut in the longitudinal direction so as to provide a circumferentially resilient union piece with a slot 3a. By its resilience, the tubular union piece, with its end portions, will sealingly embrace the outer peripheral surfaces 2c of the conduits 1 to be joined.

A strip 4 of a mouldable, light-curable polyester material is placed on the slot 3a so as to cover the slot throughout its entire length while leaving the ends of the slot open. A suitable light-curable glass fibre reinforced material is manufactured and sold by BASF under the tradename PALATAL which is an unsaturated glass fibre reinforced UV-curable polyester. The polyester strip 4 is cured by the application of light so as to be bonded to the union piece 3 of polyester. The joint 2b between the conduits 1 is supplied in a suitable manner, e.g. by injection through the strip 4, with a foamble liquid, for instance a mixture of polyol and isocyanate, for obtaining a polyurethane foam, in an amount sufficient for the cured foam to completely fill the joint 2b. Air and gases in the polyurethane foam may escape through the open ends of the slot. The union piece 3 and the light-cured strip 4 thus serve as a mould for the cellular plastic. Because of its transparency, the mould makes it possible to visually check that the entire joint or joint space 2b is filled with cellular plastic.

What I claim and desire to secure by Letters Patent is:

1. A method for joining insulated conduits having an insulated exterior pipe, a medium carrying pipe generally concentric therewith and insulation between said pipe, with bare medium carrying pipe extending beyond said exterior pipe and insulation at the point where two such medium carrying pipes are joined, the method including the steps of:

applying a piece of resilient lengthwise slotted union over said bare pipes and over a portion of the exterior pipes;

bonding a moldable, curable strip onto said union along the entire length of said slot so as to generally seal the peripheral surface of the union, injecting a foamable insulating material through said strip into the space between said union and said medium carrying pipes.

2. A method according to claim 1 wherein said strip is transparent and said insulation is injected until the space is filled according to a visual check through said transparent strip.

3. A method according to claim 1 wherein said strip is bonded to said union by using an unsaturated polyester material for the strip and applying ultraviolet light to cure said bond.

* * * * *